US012744334B2

(12) United States Patent
Ortiz et al.

(10) Patent No.: US 12,744,334 B2
(45) Date of Patent: Sep. 22, 2026

(54) METAL 3D PRINTED ANTENNA HAVING CROSS-DIPOLE RADIATING ELEMENTS THEREIN AND METHODS OF MANUFACTURING SAME

(71) Applicant: Outdoor Wireless Networks LLC, Claremont, NC (US)

(72) Inventors: Fernando Ortiz, Dallas, TX (US); Bo Wu, Allen, TX (US); Chengcheng Tang, Murphy, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 94 days.

(21) Appl. No.: 18/855,480

(22) PCT Filed: Mar. 13, 2023

(86) PCT No.: PCT/US2023/015072
§ 371 (c)(1),
(2) Date: Oct. 9, 2024

(87) PCT Pub. No.: WO2023/211575
PCT Pub. Date: Nov. 2, 2023

(65) Prior Publication Data

US 2025/0233323 A1 Jul. 17, 2025

Related U.S. Application Data

(60) Provisional application No. 63/336,981, filed on Apr. 29, 2022.

(51) Int. Cl.

| | |
|---|---|
| ***H01Q 21/26*** | (2006.01) |
| ***H01Q 15/14*** | (2006.01) |

(Continued)

(52) U.S. Cl.
CPC ............ *H01Q 21/26* (2013.01); *H01Q 15/14* (2013.01); *H01Q 21/0087* (2013.01); *H01Q 21/061* (2013.01); *H01Q 25/001* (2013.01)

(58) Field of Classification Search
CPC .. H01Q 15/14; H01Q 21/0087; H01Q 21/061; H01Q 21/26; H01Q 25/001
See application file for complete search history.

(56) References Cited

U.S. PATENT DOCUMENTS 11,909,120 B1 * 2/2024 Tianang ................ H01Q 21/26
2017/0062925 A1 3/2017 Sanchez
(Continued)

FOREIGN PATENT DOCUMENTS

WO 2021040892 A1 3/2021
WO 2021072032 A1 4/2021

OTHER PUBLICATIONS

Notification of Transmittal of the International Search Report and the Written Opinion of the International Searching Authority, or the Declaration, in corresponding PCT Application No. PCT/US2023/015072 (May 25, 2023).

*Primary Examiner* — Daniel Munoz
(74) *Attorney, Agent, or Firm* — Myers Bigel, P.A.

(57) ABSTRACT

An antenna includes a metal 3D printed array of radiating elements configured as a unitary arrangement of a metal reflector, a plurality of metal support stalks extending forwardly of the metal reflector, and a plurality metal radiating arms attached to distal ends of corresponding ones of the plurality of metal support stalks. The unitary arrangement also includes a plurality of 3D printed metal feed stalks, which extend forwardly of the metal reflector and contact corresponding ones of the plurality of metal radiating arms, a 3D printed metal filter chassis on a rear-facing surface of
(Continued)

the metal reflector, and 3D printed array of cavity filters with resonators within the metal filter chassis.

19 Claims, 6 Drawing Sheets

(51) Int. Cl.

| | |
|---|---|
| ***H01Q 21/00*** | (2006.01) |
| ***H01Q 21/06*** | (2006.01) |
| ***H01Q 25/00*** | (2006.01) |

(56) References Cited

U.S. PATENT DOCUMENTS

| | | | |
|---|---|---|---|
| 2017/0256849 | A1 | 9/2017 | Cohen |
| 2017/0256859 | A1 | 9/2017 | Boryssenko et al. |
| 2019/0299283 | A1 | 10/2019 | Sheinman |
| 2022/0263248 | A1 | 8/2022 | Tang et al. |

* cited by examiner

METAL 3D PRINTED ANTENNA HAVING CROSS-DIPOLE RADIATING ELEMENTS THEREIN AND METHODS OF MANUFACTURING SAME

CLAIM OF PRIORITY

The present application is a 35 U.S.C. § 371 national stage application of PCT Application No. PCT/US2023/015072, filed Mar. 13, 2023, which claims priority under 35 U.S.C. § 119 to U.S. Provisional Application Ser. No. 63/336,981, filed Apr. 29, 2022, the entire contents of which are incorporated herein by reference. The above-referenced PCT Application was published in the English language as International Publication No. WO 2023/211575 A1 on Nov. 2, 2023.

FIELD OF THE INVENTION

The present invention relates to radio communications and, more particularly, to radiating elements for base station antennas used in cellular communication systems.

BACKGROUND

Cellular communications systems are well known in the art. In a cellular communications system, a geographic area is divided into a series of regions that are referred to as "cells" which are served by respective base stations. Each base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas that have an azimuth Half Power Beamwidth (HPBW) of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the ever-increasing volume of cellular communications, cellular operators have added cellular service in a variety of new frequency bands. Cellular operators have applied a variety of approaches to support service in these new frequency bands, including deploying linear arrays of "wide-band" radiating elements that provide service in multiple frequency bands, and deploying multi-band base station antennas that include multiple linear arrays (or planar arrays) of radiating elements that support service in different frequency bands. Examples of multiband base station antennas are disclosed in commonly-assigned U.S. application Ser. No. 17/630,725, filed Jan. 27, 2022, and in PCT Publication No. WO 2021/072032, the disclosures of which are hereby incorporated herein by reference.

SUMMARY OF THE INVENTION

An antenna according to embodiments of the invention can include a metal 3D printed array of radiating elements configured as a unitary arrangement of: (i) a 3D printed metal reflector, (ii) a plurality of 3D printed metal support stalks extending forwardly of the metal reflector, (iii) a plurality 3D printed metal radiating arms attached to distal ends of corresponding ones of the plurality of metal support stalks, and (iv) a plurality of 3D printed metal feed stalks, which extend forwardly of the metal reflector and contact corresponding ones of the plurality of metal radiating arms. These embodiments may further include a plurality of metal feed signal traces extending adjacent a forward-facing surface of the metal reflector. These metal feed signal traces may be 3D printed in some embodiments, and may be electrically connected to corresponding ones of the plurality of metal feed stalks. Advantageously, each of the plurality of metal feed signal traces may be separated from the forward-facing surface of the metal reflector by an electrically insulating material, which may be a 3D printed material. In some embodiments, the electrically insulating material may extend between the forward-facing surface of the metal reflector and a base of each of the plurality of metal feed stalks.

According to further embodiments of the invention, the 3D printed unitary arrangement may further include: (i) a 3D printed metal filter chassis on a rear-facing surface of the metal reflector, (ii) a 3D printed array of cavity filters with resonators within the metal filter chassis, and (iii) a 3D printed metal lid, which encloses the array of cavity filters within the metal filter chassis.

According to additional embodiments of the invention, the unitary arrangement may include a plurality of 3D printed metal fences, which extend on a forward-facing surface of the metal reflector. In some embodiments, these metal fences may be configured as a row of T-shaped 3D printed metal fences, which are integrated into a forward-facing surface of the metal reflector and extend between first and second sub-arrays of the radiating elements.

A method of manufacturing an antenna may also be provided, which includes metal 3D printing a metal reflector, and metal 3D printing an array of cross-dipole radiating elements on a forward-facing surface of the metal reflector, such that the metal reflector and the array of cross-dipole radiating elements are configured as a single-piece unitary metal structure. In some of these embodiments, the metal 3D printing may be performed using a direct metal laser melting (DMLM) printing process or a metal binder jetting (MBJ) printing process; however, other metal 3D printing technologies may also be used. In addition, steps may be performed to 3D print a metal filter chassis and an array of cavity filters with resonators within the metal filter chassis, such that the metal filter chassis and the array of cavity filters (with resonators) extend adjacent a rear-facing surface of the metal reflector. In some embodiments, the 3D printing of the metal reflector may follow the metal 3D printing of the metal filter chassis and the array of cavity filters.

According to additional embodiments of the invention, a plurality of metal feed signal traces may be 3D printed on the forward-facing surface of the metal reflector, yet also be separated from the forward-facing surface of the metal reflector by an electrically insulating material, which may be a layer that is 3D printed directly on the forward-facing surface. In addition, the step of metal 3D printing the array of cross-dipole radiating elements may include metal 3D printing a plurality of metal feed stalks onto each of the plurality of metal feed signal traces, and may be performed concurrently with 3D printing a plurality of metal fences on the forward-facing surface of the metal reflector.

DETAILED DESCRIPTION OF EMBODIMENTS

Figure 1A:
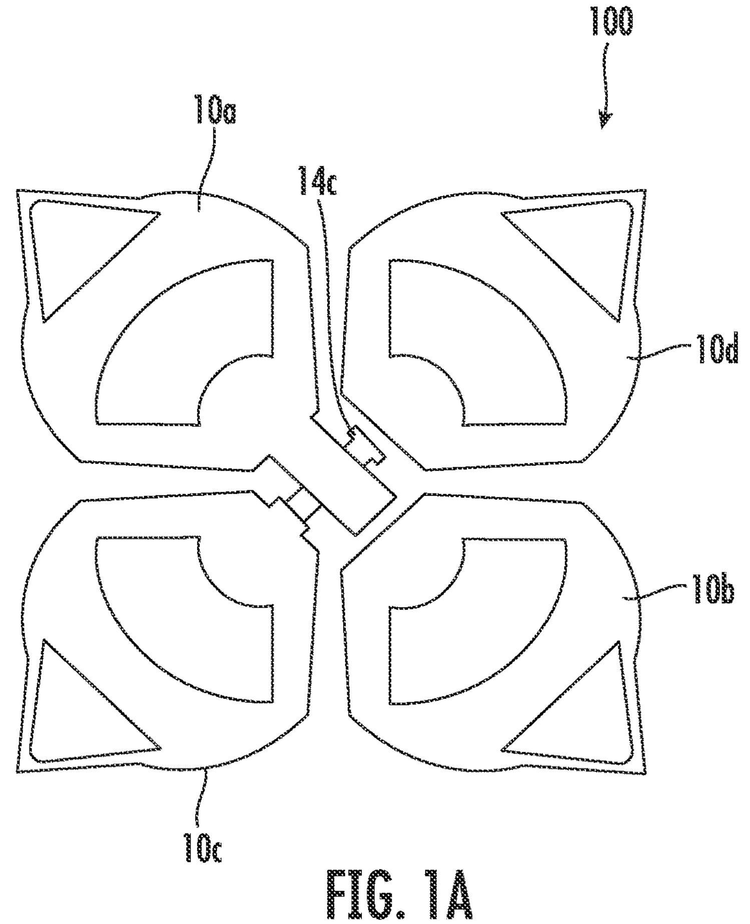
FIG. 1A is a plan view of a metal 3D printed cross-dipole radiating element according to an embodiment of the invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
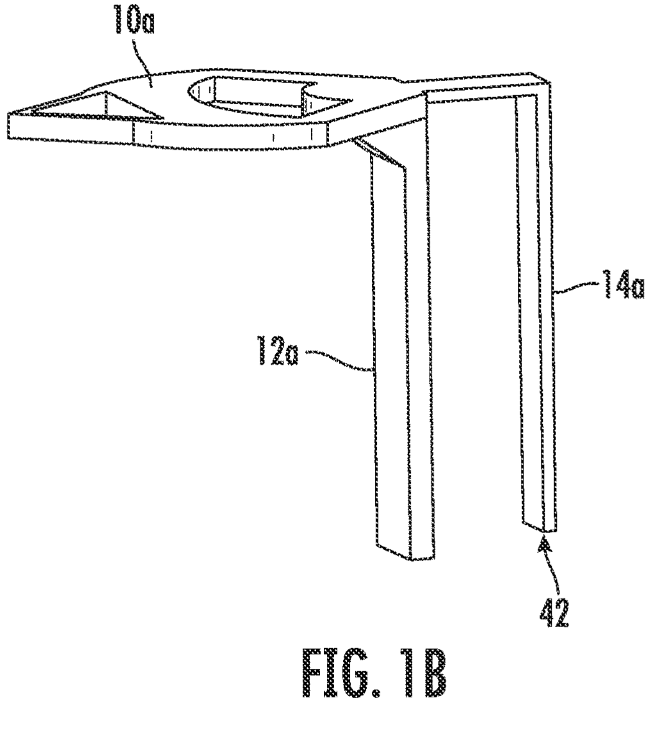
FIG. 1B is a side perspective view of a metal 3D printed radiating element according to an embodiment of the invention.
Figure 1C:
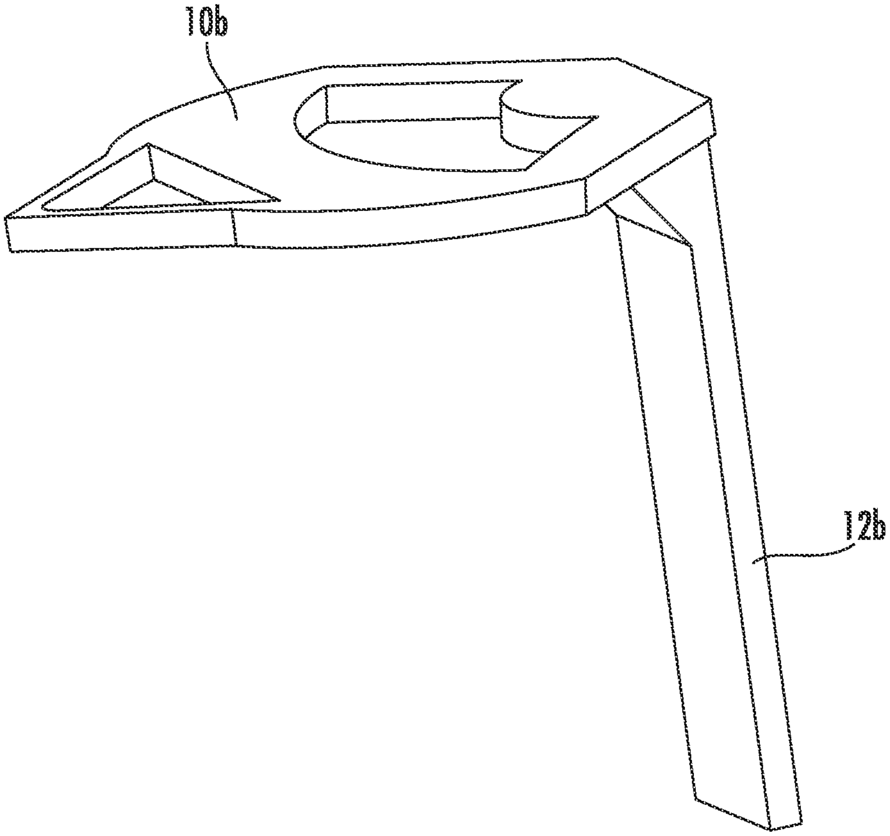
FIG. 1C is a side perspective view of a metal 3D printed radiating element according to an embodiment of the invention.

Referring now to FIG. 1A, a wide-band cross-dipole radiating element 100 according to an embodiment of the invention is illustrated as including: (i) a first dipole radiating element having a first pair of metal radiating arms 10*a*, 10*b* that radiate at a first polarization (e.g., +45°), and (ii) a second dipole radiating element having a second pair of metal radiating arms 10*c*, 10*d* that radiate at a second polarization (e.g., −45°). As shown by FIG. 1B, the first metal radiating arm 10*a* is supported above a forward-facing surface of an underlying metal reflector (not shown) by a "grounded" first metal support stalk 12*a*, and is configured to receive a corresponding radio frequency (RF) feed signal, which is provided by a first metal feed stalk 14*a*. As will be understood by those skilled in the art, the first support stalk 12*a* and the first feed stalk 14*a* define a corresponding microstrip line structure with the first support stalk 12*a* operating as an outer conductor, the first feed stalk 14*a* operating as an inner conductor, and air operating as a dielectric medium extending between the first support stalk 12*a* and the first feed stalk 14*a*. In contrast, and as shown by FIG. 1C, a second metal radiating arm 10*b* is supported above an underlying reflector by a second metal support stalk 12*b*, however, no corresponding feed stalk is utilized. In FIGS. 1B-1C, the bases of the first and second support stalks 12*a*-12*b* are contiguous with the underlying metal reflector, whereas the base of the first feed stalk 14*a* is contiguous with a terminal end of a corresponding feed signal trace, as explained more fully hereinbelow.

Similarly, the third radiating arm 10*c* of the second dipole radiating element may be supported above the underlying metal reflector using a third metal support stalk (not shown), and may receive a corresponding RF feed signal via a second feed stalk 14*c*. The third radiating arm 10*c* may be almost identical to the first radiating arm 10*a*, with the one difference being that the forward portion of the feed stalk 14*c* associated with the third radiating arm 10*c* includes a U-shaped portion that allows the feed stalk 14*c* to pass behind (i.e., underneath) a corresponding horizontal portion of the first feed stalk 14*a*, so that the first and second feed stalks 14*a*, 14*c* do not contact each other. And, the fourth radiating arm 10*d* of the second dipole radiating element, which may be identical to the second radiating arm 10*b*, may be supported using a fourth metal support stalk (not shown). Thus, the first and second "orthogonal" dipole radiating elements within the cross-dipole radiating element 100 may have analogous configurations, such that each dipole radiating element utilizes two support stalks and one feed stalk, as generally illustrated by FIGS. 1B-1C.

Figure 2A:
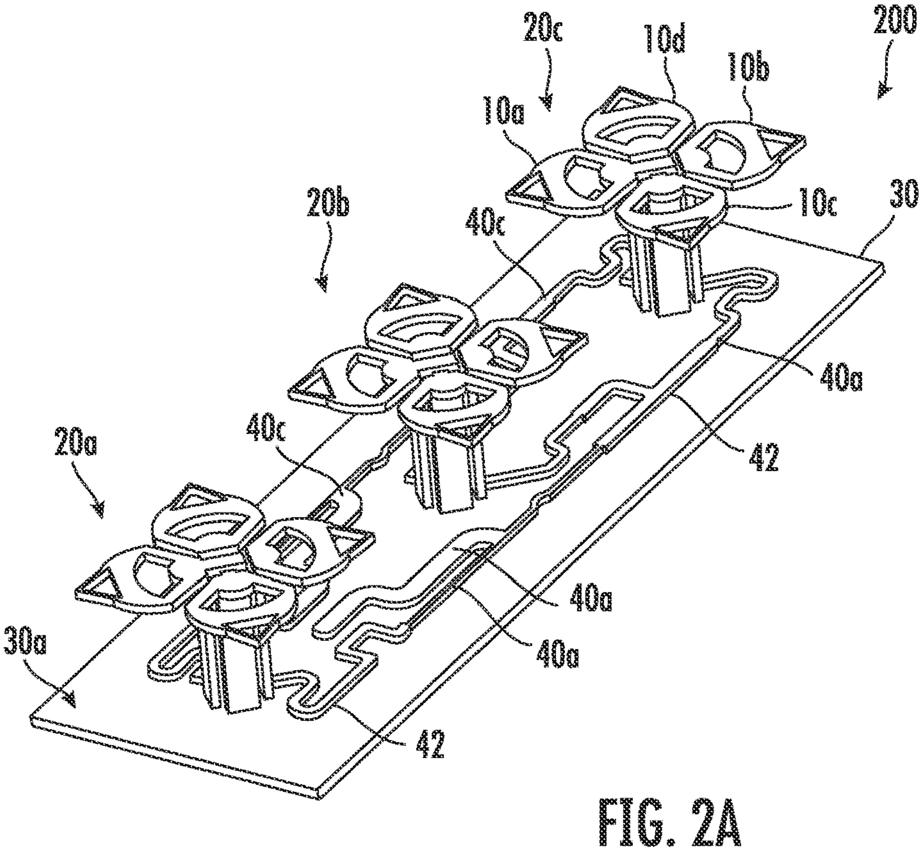
FIG. 2A is a front perspective view of an antenna containing a metal 3D printed array of three (3) cross-dipole radiating elements on a metal reflector, according to an embodiment of the invention.
Figure 2B:
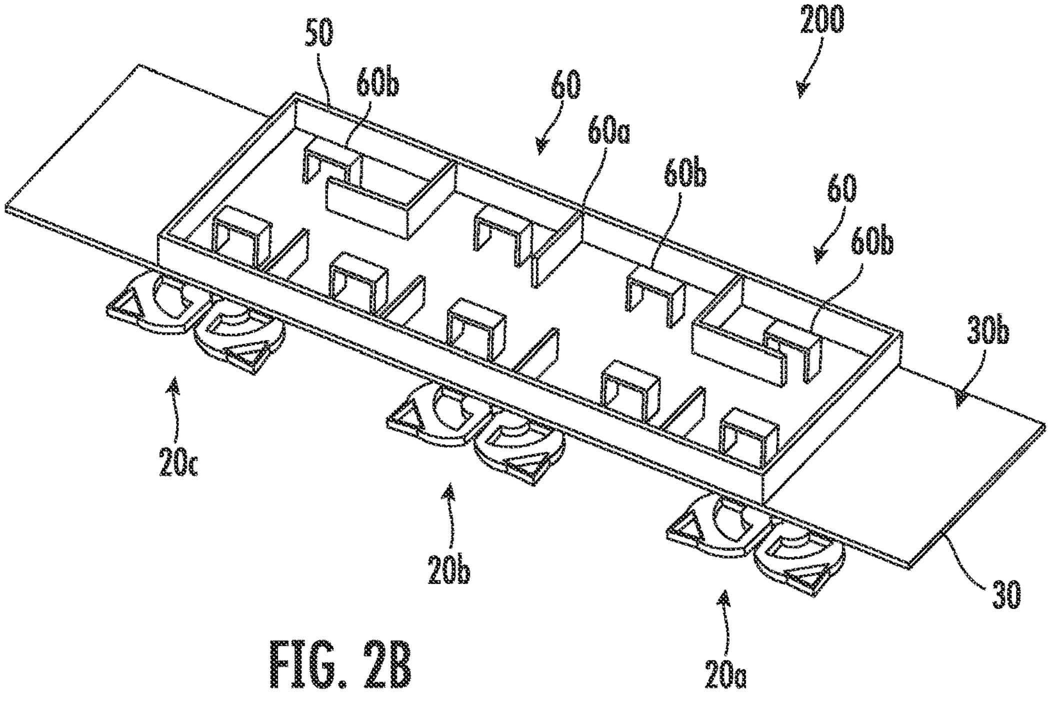
FIG. 2B is a rear perspective view of the antenna of FIG. 2A, which illustrates a 3D printed metal filter chassis enclosing an array of 3D printed cavity-type filters, according to an embodiment of the invention.
Figure 2C:
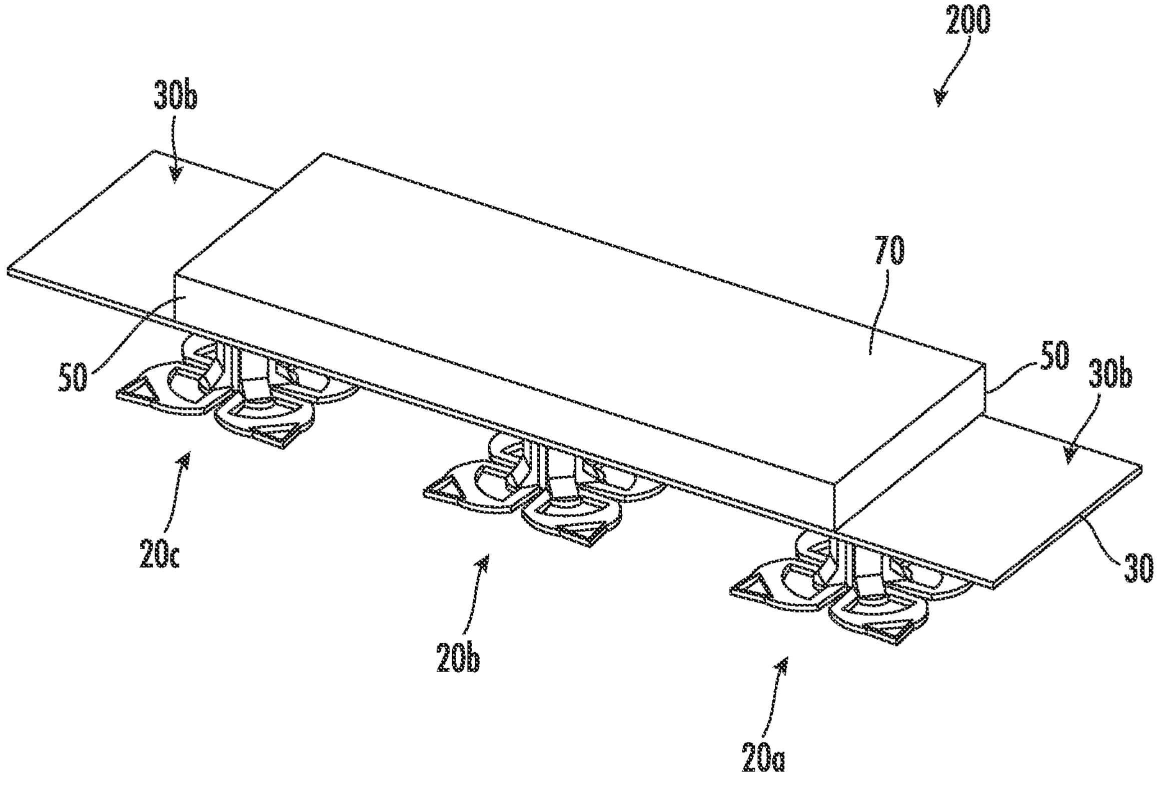
FIG. 2C is a rear perspective view of the antenna of FIG. 2B with a 3D metal printed lid, according to an embodiment of the invention.

Referring now to FIGS. 2A-2C, an antenna 200 according to another embodiment of the invention is illustrated as including a unitary arrangement of: (i) a metal 3D printed array of cross-dipole radiating elements 20*a*, 20*b*, 20*c*, which may each be equivalent to the cross-dipole radiating element 100 of FIGS. 1A-1C, and (ii) an underlying 3D printed metal reflector 30. As shown best by FIG. 2A, the unitary arrangement may further include a pair of 3D printed metal feed signal traces 40a, 40c, which extend adjacent a forward-facing surface 30a of the metal reflector 30 and distribute a pair of cross-polarized input feed signals to each pair of metal 3D printed feed stalks (e.g., 14a, 14c) associated with each of the cross-dipole radiating elements 20a, 20b, 20c. A thin electrically insulating layer 42 may be provided between an underside of each of the pair of 3D printed metal feed signal traces 40a, 40c and the forward-facing surface 30a of the reflector 30, and also between the base of each of the metal 3D printed feed stalks and the forward-facing surface 30a. In some embodiments, this thin electrically insulating layer 42 may be 3D printed (as part of the unitary arrangement) or separately deposited as a blanket or partial layer and then patterned, for example.

Referring now to FIGS. 2B-2C, the unitary arrangement may further include a 3D printed metal filter chassis 50, and a 3D printed array of partitions 60a and resonators 60b, which collectively define a plurality of cavity filters 60 on a rear-facing surface 30b of the reflector 30, upon enclosure by a 3D printed metal lid 70. Advantageously, the sequential and potentially uninterrupted 3D printing of the metal lid 70, the cavity filters 60 (and chassis 50), the metal reflector 30 and the cross-dipole radiating elements 20a-20c, may yield a more highly integrated "all-metal" antenna 200 having improved electrical characteristics, including potentially lower passive intermodulation (PIM) interference, higher yield and lower manufacturing costs. Exemplary metal 3D printing technologies according to embodiments of the invention may include, but are not limited to, direct metal laser melting (DMLM) processes and metal binder jetting (MBJ) processes. Nonetheless, according to alternative embodiments of the invention, one or more of the above-described components of the antenna 200 may be provided as pre-fabricated metal components (e.g., reflector 30, lid 70), which are suitable for integration within a metal 3D printing manufacturing process.

Figure 3A:
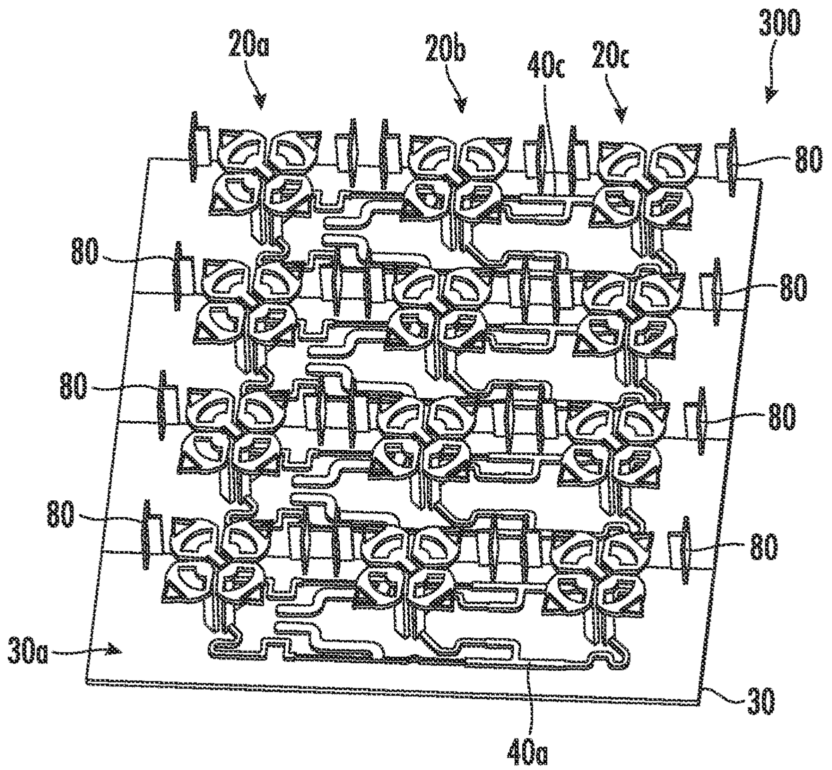
FIG. 3A is a front perspective view of an antenna containing a metal 3D printed array of twelve (12) radiating elements and 3D printed T-shaped fences, on a metal reflector, according to an embodiment of the invention.
Figure 3B:
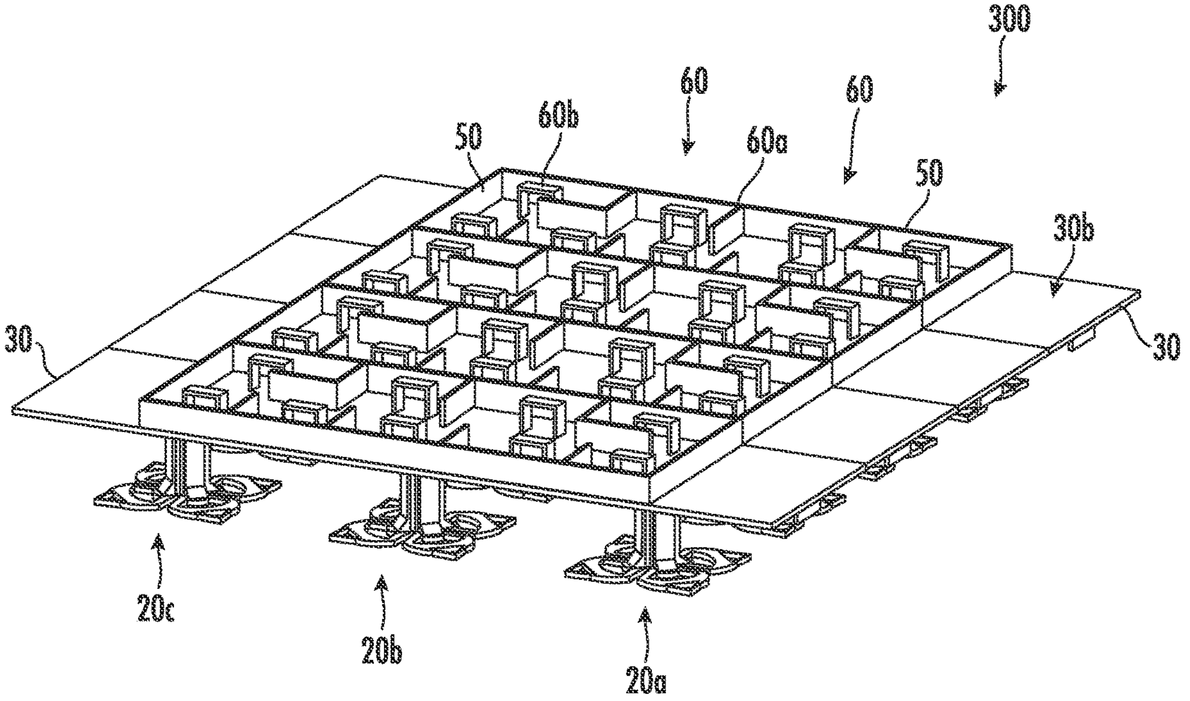
FIG. 3B is a rear perspective view of the antenna of FIG. 3A, which illustrates a 3D printed metal filter chassis enclosing multiple arrays of 3D printed cavity-type filters, according to an embodiment of the invention.
Figure 3C:
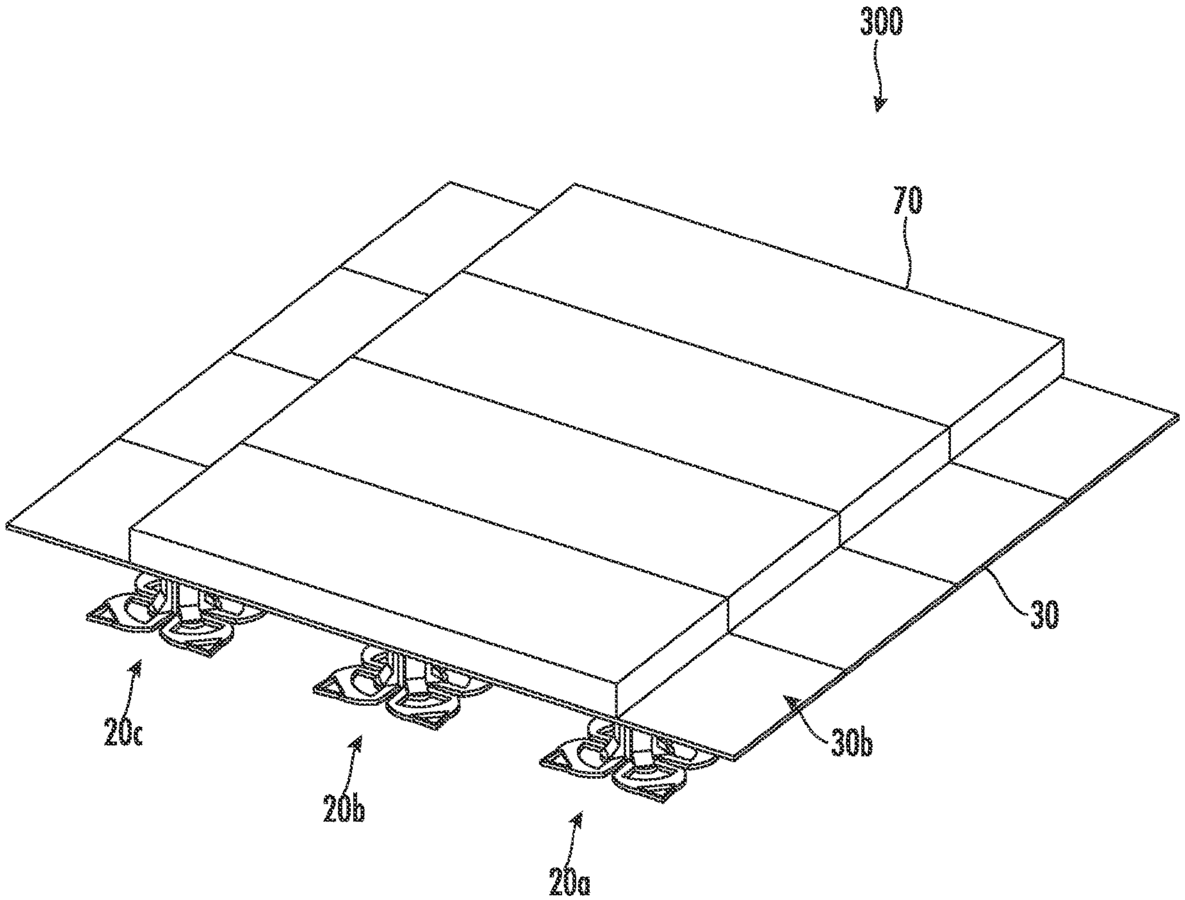
FIG. 3C is a rear perspective view of the antenna of FIG. 3B with a 3D metal printed lid, according to an embodiment of the invention.

Further integration advantages may also be achieved by printing multiple sub-arrays together into a single unitary arrangement. For example, as shown by FIGS. 3A-3C, an all-metal antenna 300 may be printed to include a 4×3 array of the cross-dipole radiating elements 20a, 20b, 20c of FIG. 2A, along with T-shaped 3D printed metal fences 80, which may function to improve the cross-polarization ratio (CPR) characteristics of the more highly integrated antenna 300. In addition, as shown by FIGS. 3B-3C, the antenna 300 may also include a 3D printed metal filter chassis 50 and a 3D printed array of cavity filters 60 (with 3D printed metal lid 70), as described hereinabove with respect to FIGS. 2B-2C.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An antenna, comprising:

a metal 3D printed array of radiating elements configured as a unitary arrangement of a metal reflector, a plurality of metal support stalks extending forwardly of the metal reflector, and a plurality metal radiating arms attached to distal ends of corresponding ones of the plurality of metal support stalks, wherein the metal radiating arms are arranged in pairs of metal radiating arms to provide a plurality of dipole radiators, and wherein the unitary arrangement further comprises a plurality of 3D printed metal feed stalks, which extend forwardly of the metal reflector, each metal feed stalk comprising a first segment that extends in parallel to a respective one of the metal support stalks and a second segment that directly contacts a first of the metal radiating arms in a respective one of the pairs of metal radiating arms.

2. The antenna of claim 1, further comprising a plurality of metal feed signal traces extending adjacent a forward-facing surface of the metal reflector.

3. The antenna of claim 2, wherein each of the plurality of metal feed signal traces is electrically connected to a corresponding one or more of the plurality of metal feed stalks.

4. The antenna of claim 3, wherein each of the plurality of metal feed signal traces is separated from the forward-facing surface of the metal reflector by an electrically insulating material.

5. The antenna of claim 4, wherein the electrically insulating material extends between the forward-facing surface of the metal reflector and a base of each of the plurality of metal feed stalks.

6. The antenna of claim 3, wherein the unitary arrangement further comprises a 3D printed metal filter chassis on a rear-facing surface of the metal reflector, and a 3D printed array of cavity filters with resonators within the metal filter chassis.

7. The antenna of claim 3, wherein the unitary arrangement further comprises a plurality of 3D printed metal fences extending on a forward-facing surface of the metal reflector.

8. The antenna of claim 3, wherein the unitary arrangement further comprises a row of T-shaped 3D printed metal fences, which are integrated into a forward-facing surface of the metal reflector and extend between first and second sub-arrays of the radiating elements.

9. The antenna of claim 1, wherein a base portion of each metal feed stalk that is adjacent the metal reflector has a major surface that is positioned in between first and second of the metal support stalks and is parallel to major surfaces of first and second of the metal support stalks.

10. A method of manufacturing an antenna, comprising:

metal 3D printing a metal reflector;

metal 3D printing an array of cross-dipole radiating elements on a forward-facing surface of the metal reflector, such that the metal reflector and the array of cross-dipole radiating elements are configured as a single-piece unitary metal structure, metal 3D printing a metal filter chassis and an array of cavity filters with resonators within the metal filter chassis, such that the metal filter chassis and the array of cavity filters with resonators extend adjacent a rear-facing surface of the metal reflector.

11. The method of claim 10, further comprising metal 3D printing a plurality of metal feed signal traces on the forward-facing surface of the metal reflector.

12. The method of claim 11, wherein the plurality of metal feed signal traces are separated from the forward-facing surface of the metal reflector by an electrically insulating material.

13. The method of claim 11, wherein said metal 3D printing an array of cross-dipole radiating elements comprises metal 3D printing a plurality of metal feed stalks onto each of the plurality of metal feed signal traces.

14. The method of claim 13, wherein said metal 3D printing a metal reflector follows said metal 3D printing a metal filter chassis and an array of cavity filters with resonators within the metal filter chassis.

15. The method of claim 10, wherein said metal 3D printing an array of cross-dipole radiating elements on a forward-facing surface of the metal reflector is performed concurrently with metal 3D printing a plurality of metal fences on the forward-facing surface of the metal reflector.

16. The method of claim 10, wherein the array of cross-dipole radiating elements is printed using a direct metal laser melting printing process or a metal binder jetting printing process.

17. An antenna, comprising:

a metal reflector; and a metal 3D printed array of radiating elements configured as a unitary arrangement of: (i) a plurality of metal support stalks extending forwardly of the metal reflector, (ii) a plurality metal radiating arms attached to distal ends of corresponding ones of the plurality of metal support stalks, and (iii) a plurality of 3D printed metal feed stalks, which extend forwardly of the metal reflector and contact corresponding ones of the plurality of metal radiating arms, wherein a base portion of each metal feed stalk that is adjacent the metal reflector has a major surface that is positioned in between first and second of the metal support stalks and is parallel to major surfaces of first and second of the metal support stalks.

18. The antenna of claim 17, further comprising a 3D printed metal filter chassis on a rear-facing surface of the metal reflector.

19. The antenna of claim 18, further comprising a 3D printed array of cavity filters, with resonators, within the metal filter chassis.

* * * * *